United States Patent [19]

Hoffman

[11] Patent Number: 4,487,396
[45] Date of Patent: Dec. 11, 1984

[54] SCOTCH BLOCK ATTACHMENT FITTING

[76] Inventor: Frederick M. Hoffman, 600 Holgate Ave., Defiance, Ohio 43512

[21] Appl. No.: 532,060

[22] Filed: Sep. 14, 1983

[51] Int. Cl.³ .......................... B66D 1/36; B60T 1/04
[52] U.S. Cl. ..................... 254/327; 254/415; 24/658; 24/700; 188/4 R; 293/117; 403/353; 414/563
[58] Field of Search .............. 254/323, 325, 326, 327, 254/328, 280, 281, 282, 286, 389, 415; 414/563; 293/1, 117; 188/4 R; 403/353; 24/231, 658, 700

[56] References Cited

U.S. PATENT DOCUMENTS

| | | | |
|---|---|---|---|
| 1,801,246 | 4/1931 | Foltz | 254/282 X |
| 2,283,443 | 5/1942 | Klein | 414/563 X |
| 2,645,309 | 7/1953 | Grotz | 188/4 R |
| 2,708,009 | 5/1955 | Allison et al. | 188/4 R |
| 2,766,966 | 10/1956 | Roessler | 254/326 |
| 2,772,754 | 12/1956 | Roessler | 188/4 R |
| 2,822,890 | 2/1958 | Kriewaldt | 188/4 R X |
| 3,119,601 | 1/1964 | Blount | 254/280 |
| 3,250,506 | 5/1966 | Thouvenelle et al. | 403/353 X |
| 3,322,396 | 5/1967 | Hubbard | 254/327 X |
| 3,899,093 | 8/1975 | Allen | 254/327 X |
| 4,057,211 | 11/1977 | Moore | 254/415 X |
| 4,150,465 | 4/1979 | Gavin | 403/353 X |
| 4,265,463 | 5/1981 | Perruso | 414/563 X |
| 4,274,791 | 6/1981 | Moon | 414/563 |

Primary Examiner—John M. Jillions
Assistant Examiner—Joseph J. Hail, III
Attorney, Agent, or Firm—Harvey B. Jacobson

[57] ABSTRACT

A wrecker for towing disabled automobiles and the like has attachment fittings on the rear bumper each for securing a scotch block chain and a snatch block to the bumper at the same location on the bumper. When an automobile is being winched into towing position, buckling forces exerted on the bumper by tension developed in the scotch block chains are counterbalanced by forces exerted on the bumper by tension developed in the winching cable which is passed around pulleys on the snatch blocks.

8 Claims, 5 Drawing Figures

SCOTCH BLOCK ATTACHMENT FITTING

BACKGROUND OF THE INVENTION

This invention relates to vehicles, commonly referred to as tow-trucks or wreckers, which are used for moving broken-down or damaged automobiles and the like.

Commonly, wreckers employ a boom with a winch and cable arrangement for hooking up to a broken down automobile. For towing purposes, it is necessary to hook the cable to the automobile and winch the automobile into elevated inclined towing position immediately behind the wrecker, generally with the front or rear wheels of the automnobile remaining in ground engagement. The forces involved during winching tend to draw the wrecker and automobile toward one another and accordingly the wrecker itself is generally immobilized to prevent its rearward movement during winching. One commonly employed means for preventing rearward movement of a wrecker during winching consists in placing ramp-like elements, known as scotch blocks, under the rear wheels of the wrecker, the scotch blocks being secured by chains to the rear bumper structure of the wrecker. However, with this arrangement, tension is developed in the chains during winching tending to distort or buckle the bumper structure. To overcome this problem, it is known to add reinforcement to the rear structure of the wrecker, but the additional weight of such reinforcement reduces the towing capacity of the wrecker. The present invention provides an alternative solution to the problem of rear bumper damage to wreckers, which does not involve any significant increase in weight and consequent loss in towing capacity.

DESCRIPTION OF THE PRIOR ART

Applicant is aware of the following U.S. patents relating generally to wrecker winching equipment:
U.S. Pat. No. 2,283,443; May 19, 1942
U.S. Pat. No. 4,265,463; May 5, 1981
U.S. Pat. No. 4,274,791; June 23, 1981

SUMMARY OF THE INVENTION

The present invention is based upon the principle of utilizing the forces present in the winching cable of a wrecker developed during winching of a automobile into towing position, to offset or balance forces on the rear of the wrecker caused by scotch block chains. To this end, the lengths of winching cable passing respectively from the wrecker boom to the automobile being winched and back to the boom are passed through respective pulleys on snatch blocks attached to the rear bumper structure of the wrecker at suitable locations for producing forces on the bumper counteracting the forces imposed by the scotch block chains, such locations generally being the same locations at which the scotch block chains are attached. With this arrangement, the resultant of the forces developed in the winching cable on opposite sides of the respective snatch block pulleys, opposes the forces developed in the scotch block chains, thereby tending to equalize the forces on the rear bumper structure of the wrecker and reducing the possibility of the structure being damaged by distortion.

Another beneficial effect of attaching the snatch blocks to the rear of the wrecker at, or closely adjacent to, the points of attachment of the scotch block chains (rather than at the top of the bumper structure as is common practice) is that the moment arm tending to tip the wrecker up about its rear wheels during winching is reduced, which also increases the pulling capacity of the wrecker.

The invention further contemplates the provision of integrated scotch block chain and snatch block securement fittings which may be installed as attachments to existing wreckers or may be built into newly manufactured wreckers to provide the above described interrelation between the scotch block chains and the winching cable.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
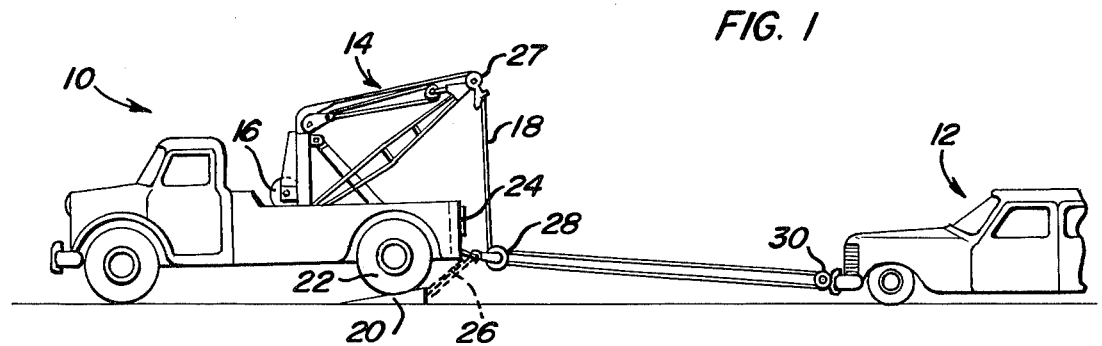
FIG. 1 is a side elevational view of a wrecker shown in the process of winching an automobile into towing position.

Referring initially to FIG. 1, a conventional form of wrecker 10 is shown in the process of winching an automobile 12 into towing position immediately behind the wrecker. For this purpose, the wrecker has the customary winching equipment including a boom 14, powered left- and right-hand winch drums 16, and a winching cable 18. To prevent rearward movement of the wrecker during winching, conventional scotch blocks 20 are positioned under the left- and right-hand rear wheels 22 of the wrecker, the scotch blocks being secured to rear bumper 24 of the wrecker by scotch block chains 26.

Winching cable 18 passes from the left- and right-hand winching drums as a loop over left- and right-hand head pulleys 27 around left- and right-hand snatch block pulleys 28 attached to the rear bumper of the wrecker at the same locations as the scotch block chains, as will be described, with the closed end of the cable loop passing over a towing pulley 30 attached by a hook or the like to the front of automobile 12.

During winching, tension is developed in chains 26 of a magnitude which may tend to buckle the rear bumper 24 of the wrecker inwardly. However, by securing the snatch block pulleys 28 on the bumper at the same locations as the scotch block chains (rather than at the top of the bumper where snatch blocks are generally attached) the tension force in the scotch block chains is counteracted by the resultant of forces developed in the winching cable 18 on opposite sides of the snatch block pulleys. Thus, the lengths of cable between pulleys 27 and 28 develop a substantially vertically extending tensile force, while the lengths of cable between pulleys 28 and 30 develop a substantially horizontal tensile force. The resultant of these cable forces has a magnitude and acts in a direction substantially counteracting the tension force in the scotch block chains 26, so that buckling forces on the bumper are effectively balanced or reduced.

The purpose of snatch block pulleys is to reduce the moment arm tending to tip the wrecker up about the rear wheels during winching compared with the moment arm that would prevail if the winching cable were to extend to the load (automobile 12) directly from the head pulleys 27, the reduction in moment arm thereby increasing the load capacity of the wrecker. By securing the snatch blocks toward the bottom of the bumper as in the present invention, rather than at the top of the bumper as previously, the moment arm is thus further reduced, and the load capacity of the wrecker is increased accordingly.

Figure 2:
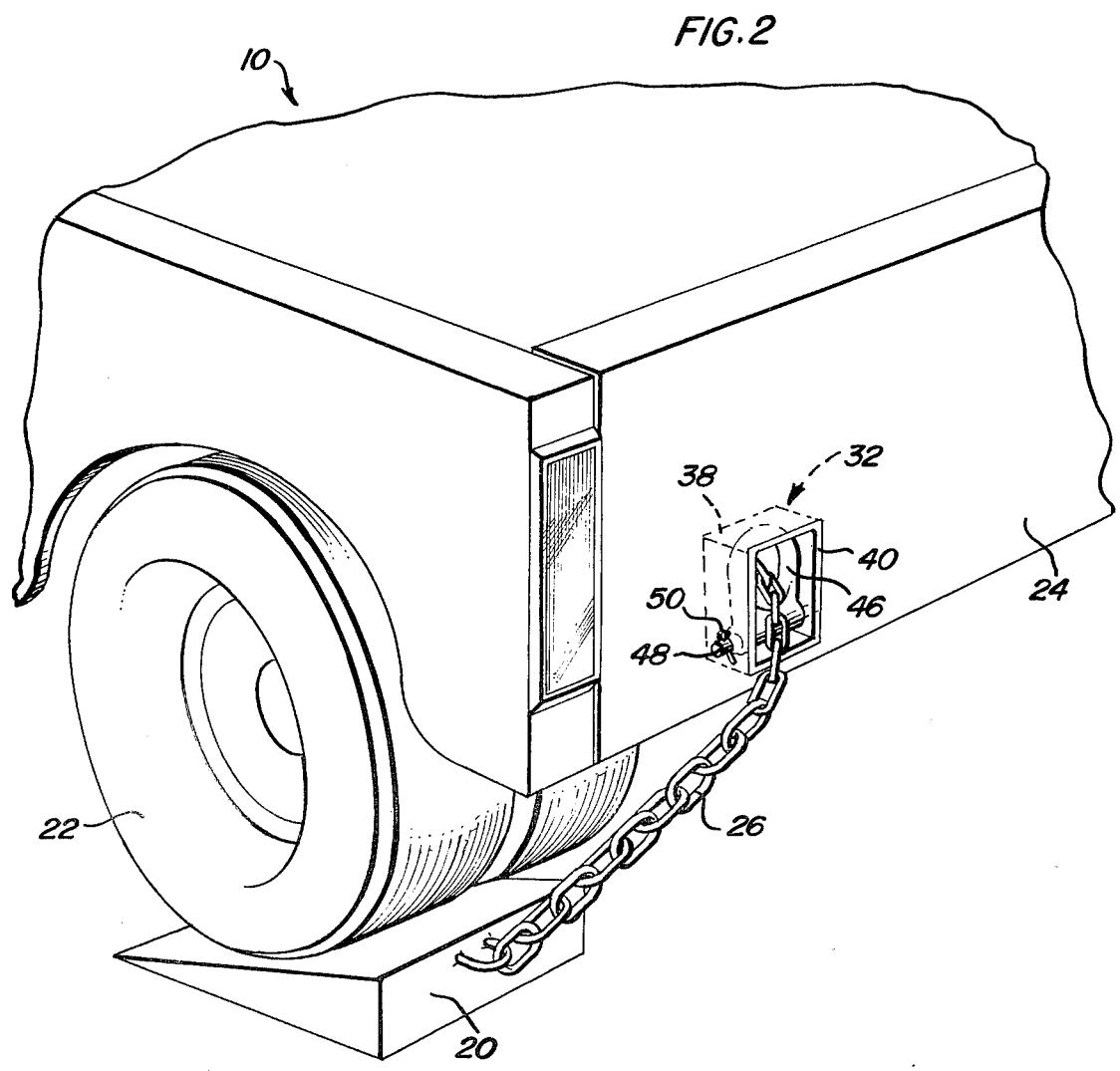
FIG. 2 is a perspective view of a rear corner portion of the wrecker showing a scotch block attached to a bumper fitting of the wrecker in accordance with the invention.
Figure 3:
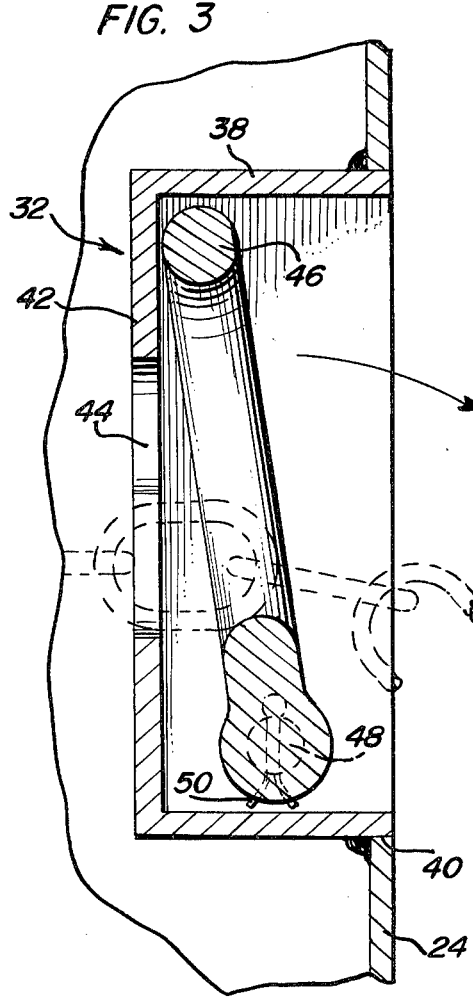
FIG. 3 is a cross-sectional view, to an enlarged scale, on line 3—3 of FIG. 2.
Figure 4:
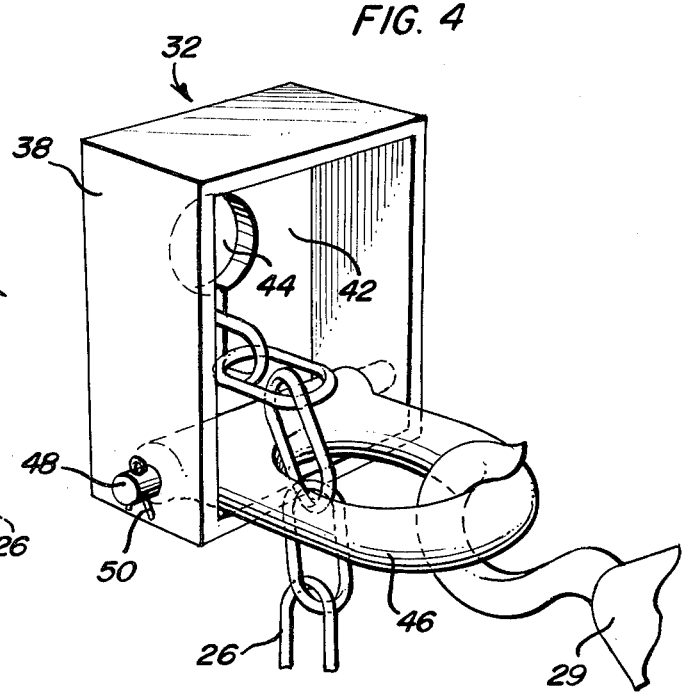
FIG. 4 is a perspective view of the bumper fitting showing the manner of securing a scotch block chain and a snatch block to the fitting.

FIGS. 2–4 illustrate one form of fitting 32 in accordance with the invention, for use in securing a snatch block and a scotch block chain to the rear bumper 24 of a wrecker in a manner providing the required balancing of forces between the scotch block chains and the winching cable as described above. Fitting 32 comprises a box structure 38 of welded plate or the like adapted to fit behind a cut-out 40 in the bumper, the box structure, for example, being welded to the rear of the bumper around the cut-out. The rear wall 42 of fitting 32 is formed with a keyhole opening 44 to releasably receive and secure the end of one of the scotch block chains 26. A U-shaped pivoted link 46 for attachment of a snatch block 29 is mounted between opposite walls of the fitting by means of a journal pin 48 and cotter pins 50, only one of which is shown. The locations of the fittings preferably corresponds with the location of conventional keyhole openings in a wrecker bumper provided for the attachment of scotch block chains. It will be understood that the fittings can be supplied as standard on newly manufactured wreckers, or they can be attached to existing wreckers by forming cut-outs in the bumper at the appropriate positions. FIG. 4 shows the orientation of the respective elements when the snatch blocks and scotch block chains are attached, the chains extending through the U-shaped links. As shown in FIGS. 2 and 3, the links 46 can be swung into the fittings when not in use. Also, the scotch block chains can be removed from the keyhole openings in the usual way.

Figure 5:
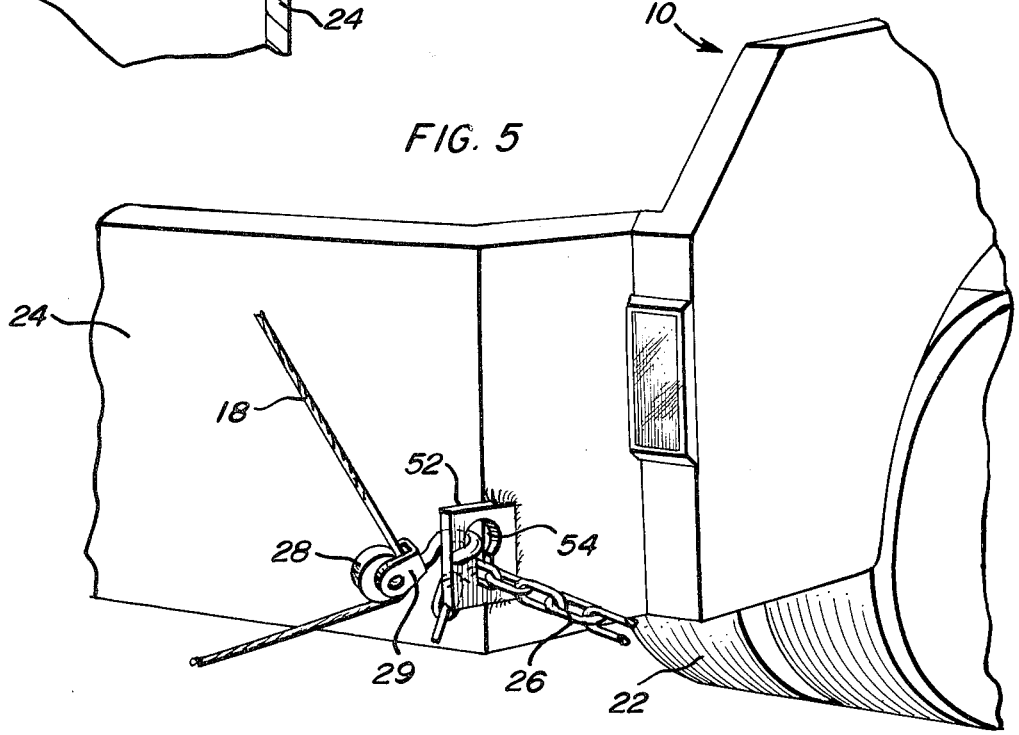
FIG. 5 is a perspective view of a rear corner of a wrecker equipped with an alternative form of scotch block chain and snatch block securement fitting in accordance with the invention.

FIG. 5 illustrates an alternative type of fitting, for use in the invention, in the form of a plate 52 with a keyhole opening 54, the plate being welded to the surface of a bumper 24 to enable a snatch block 29 to be secured to the bumper at the same location as scotch block chain 26. In this case, the snatch block is hooked into the keyhole opening. Both forms of illustrated fittings are used in pairs at opposite sides of a bumper.

It will be appreciated from the foregoing that the invention provides a simple and efficient means for reducing rear bumper damage in wreckers using scotch blocks, while also increasing the load capacity. Also, alterations may be made, within the scope of the invention in the manner and configuration of attachment to a bumper of the scotch block chains and snatch blocks.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A wrecker for towing a load such as a broken-down automobile and the like, the wrecker including winching means for winching an automobile into towing position at the rear of the wrecker, first securement means associated with the rear bumper of the wrecker for releasably attaching a left-hand scotch block chain and a left-hand snatch block and pulley for a towing cable to the bumper at a first common location on the bumper, and second securement means associated with the rear bumper of the wrecker for releasably attaching a right-hand scotch block chain and a right-hand snatch block and pulley for the towing cable to the bumper at a second common location on the bumper, whereby when winching a load to towing position, forces exerted on the bumper due to tension developed in the scotch block chains are substantially counterbalanced by forces exerted on the bumper by tension developed in the cable.

2. The invention of claim 1 wherein the first and second securement means each comprises means defining a keyhole opening for securing a respective scotch block chain, and a pivotal U-shaped link mounted adjacent the keyhole opening for attachment of a respective snatch block, the positioning of the keyhole opening and link being such that the scotch block chain when secured in the keyhole opening passes through the link.

3. The invention of claim 2 wherein the first and second securement means each comprises a box fitting attached to the inside of the bumper around a cut-out in the bumper, the keyhole opening being formed in a rear wall of a box fitting and the link being pivotally mounted between opposite sidewalls of the fitting and being receivable therein when not in use.

4. The invention of claim 1 wherein the first and second securement means each comprises a plate projecting from the bumper of the wrecker, and means defining a keyhole opening in the plate for attachment both of one of the scotch block chains and one of the snatch blocks.

5. A wrecker for towing a load, such as a broken-down automobile or the like, the wrecker comprising winching means including a winching cable for winching an automobile into towing position at the rear of the wrecker, left- and right-hand securing means associated with a rear bumper of the wrecker for attaching left- and right-hand scotch block chains to the bumper, and means for counterbalancing forces exerted on the bumper by tension developed in the scotch block chains during winching, the counterbalancing means comprising left- and right-hand snatch blocks and pulleys through which the winching cable is passed, and left- and right-hand attachment means for securing the respective snatch blocks and pulleys to the bumper at locations wherein tension developed in the cable during winching produces forces on the bumper counteracting the forces exerted thereon by the scotch block chains.

6. The invention of claim 5 wherein the winching means includes an elevated boom from which the winching cable extends downwardly to the respective snatch block pulleys, said locations being the same locations at which the scotch block chains are attached and being toward the bottom of the bumper so as to minimize a moment arm tending to tip the wrecker up about the rear wheels during winching.

7. The invention of claim 5 wherein the left-hand securing means and attachment means and the right-hand securing means and attachment means are each integrated into a single fitting secured to the bumper and comprising a keyhole opening defining the respective securing means and a pivoted link defining the respective attachment means.

8. The invention of claim 7 wherein the left-hand securing means and attachment means, and the right-hand securing means and attachment means are integrated in respective fittings secured to the bumper and each comprising a projecting plate with a keyhole opening defining both the respective securing means and attachment means.

* * * * *